(12) United States Patent  (10) Patent No.: US 8,154,980 B2
Yabe et al.  (45) Date of Patent: Apr. 10, 2012

(54) OBJECT LENS DRIVING APPARATUS AND MANUFACTURING METHOD THEREOF

(75) Inventors: Mitoru Yabe, Tokyo (JP); Keiji Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 255 days.

(21) Appl. No.: 12/447,573

(22) PCT Filed: Aug. 15, 2007

(86) PCT No.: PCT/JP2007/065898
§ 371 (c)(1),
(2), (4) Date: Apr. 28, 2009

(87) PCT Pub. No.: WO2008/065783
PCT Pub. Date: Jun. 5, 2008

(65) Prior Publication Data
US 2010/0067351 A1   Mar. 18, 2010

(30) Foreign Application Priority Data
Nov. 29, 2006  (JP) ................................ 2006-321050

(51) Int. Cl.
*G11B 7/00*  (2006.01)
(52) U.S. Cl. ............ 369/112.24; 369/44.32; 369/112.01
(58) Field of Classification Search ............. 369/112.01, 369/112.23
See application file for complete search history.

(56) References Cited

U.S. PATENT DOCUMENTS

| | | | | |
|---|---|---|---|---|
| 5,781,351 A | * | 7/1998 | Murakami et al. | 359/808 |
| 2006/0209639 A1 | | 9/2006 | Bammert et al. | |
| 2008/0052734 A1 | * | 2/2008 | Arai et al. | 720/681 |

FOREIGN PATENT DOCUMENTS

| | | | |
|---|---|---|---|
| JP | 3-230328 A | | 10/1991 |
| JP | 4-143929 A | | 5/1992 |
| JP | 10-11765 A | | 1/1998 |
| JP | 2895190 B2 | | 5/1999 |
| JP | 2001-160229 A | | 6/2001 |
| JP | 2001-160239 A | | 6/2001 |
| JP | 2001160229 A | * | 6/2001 |
| JP | 3214805 B2 | | 10/2001 |
| JP | 2005085291 A | | 3/2005 |
| JP | 2006018978 A | | 1/2006 |
| JP | 2006-260761 A | | 9/2006 |

* cited by examiner

*Primary Examiner* — Adam R Giesy
(74) *Attorney, Agent, or Firm* — Birch, Stewart, Kolasch & Birch, LLP

(57) ABSTRACT

An objective lens driving apparatus includes an objective lens (13) collecting a light flux emitted from a light source on a optical disk (11), and a lens holder (14) holding the objective lens (13). The lens holder (14) includes a first bonding portion (14*i*) and a second bonding portion (14*j*) for holding the objective lens (13) by means of bonding. The objective lens (13) is fixed to the lens holder (14) by applying a first bonding adhesive (25) to the first bonding portion (14*i*) to thereby bond the objective lens (13) thereto, adjusting an inclination of an optical axis of the objective lens (13) while causing the first bonding adhesive (25) to deform, and applying a second bonding adhesive (26) to the second bonding portion (14*j*). The second bonding adhesive (26) has a larger Young's modulus after curing than the first bonding adhesive (25).

13 Claims, 15 Drawing Sheets

OBJECT LENS DRIVING APPARATUS AND MANUFACTURING METHOD THEREOF

TECHNICAL FIELD

The present invention relates to objective lens driving apparatuses that perform recording and/or reproducing of information with respect to information recording media, and particularly relates to configurations for adjusting inclinations of optical axes of objective lenses.

BACKGROUND ART

Recently, there have been developed a variety of optical disks having different recording densities and thicknesses. Recording and reproducing of information are performed using lights of wavelengths corresponding, to specifications of respective optical disks. For example, there are a CD (Compact Disc) whose usable wavelength is in the vicinity of 780 nm, a DVD (Digital Versatile Disc) whose usable wavelength is in the vicinity of 660 nm, and a BD (Blu-Ray Disc) and a HD-DVD (High Definition DVD) whose usable wavelength is in the vicinity of 405 nm. An objective lens driving apparatus which is compatible with a plurality of kinds of optical disks with different usable wavelengths includes a plurality of objective lenses, and is configured to switch the objective lenses according to the kind of the optical disk to be used, so as to form an optimum light spot according to the kind of the optical disk. However, as a numerical aperture (NA) of the objective lens increase owing to a density growth of the optical disk, a coma aberration is likely to occur due to an inclination of an optical axis of the objective lens. Therefore, in order to obtain preferable recording and reproducing properties, it is necessary to maintain optical axes of respective objective lenses parallel to each other.

Therefore, there is proposed an optical pickup in which two objective lenses are mounted to a lens holder and a relative angle error between optical axes of the two objective lenses is adjustable (see, for example, Patent Document No. 1).

Patent Document No. 1: Japanese Laid-open Patent Publication No. 2001-160239 (Pages 1-11, FIGS. 1-14)

DISCLOSURE OF THE INVENTION

Problems to be Solved by the Invention

In an embodiment described in Patent Document No. 1, when an objective lens is to be fixed to a lens holder, the lens holder is first fixed to an adjustable table of a gonio stage, and the objective lens is held by a manipulator (separately from the lens holder). In this state, a light flux is emitted from a measuring light source, and an inclination and positions (i.e., a position in a direction of the optical axis and a position in a direction perpendicular to the optical axis) of the objective lens are adjusted using the manipulator while monitoring a light spot formed by the light flux having passed the objective lens. Further, the lens holder is moved using the adjustable table of the gonio stage to a predetermined position, and then the objective lens is fixed to the lens holder using bonding adhesive.

Therefore, it is necessary to use a large-scale precision adjusting apparatus combining the gonio stage and the manipulator, and there is a problem that a manufacturing cost increases. Furthermore, a small-sized objective lens is difficult to hold using the manipulator, and therefore there is a problem that the above described adjustment is difficult to perform. Moreover, there is a possibility that the manipulator and an objective lens of a monitoring apparatus of the light spot (an optical pickup spot evaluation apparatus) may interfere with each other. Furthermore, the objective lens is fixed to the lens holder using ultraviolet curable bonding adhesive in a state where the objective lens and the lens holder are apart from each other (or partially in contact with each other). Therefore it is difficult to apply a constant amount of the bonding adhesive, and there is a problem that a sufficient reliability of bonded portions can not be obtained.

Furthermore, the Patent Document No. 1 discloses a configuration in which a curved surface portion of an outer edge portion of the objective lens is brought into contact with a circular conical surface formed on the lens holder, and another configuration in which the outer edge portion of the objective lens is brought into contact with an inclined surface (a triangular pyramidal surface or a square pyramidal surface) formed on the lens holder as other embodiments. In either configuration, the objective lens is pressed against the lens holder and is moved in a direction perpendicular to the optical axis of the objective lens, so as to adjust an inclination of the optical axis of the objective lens. However, it is necessary to further provide a pressurizing means for pressing the objective lens against the lens holder, and there is a problem that a manufacturing cost further increases. Additionally, if a pressurizing force fluctuates, it becomes difficult to smoothly perform an adjustment due to a frictional force, and there is a possibility that an adjusting mechanism may be deformed.

The present invention is intended to solve these problems, and an object of the present invention is to provide an objective lens driving apparatus with which an inclination of an objective lens can be easily adjusted using a simple adjusting jig with high degree of accuracy.

Means of Solving the Problems

The present invention provides an objective lens driving apparatus including an objective lens collecting a light flux emitted from a light source on an information recording medium and a lens holder holding the objective lens. The lens holder includes a first bonding portion and a second bonding portion for holding the objective lens by means of bonding. The objective lens is fixed to the lens holder by applying a first bonding adhesive to the first bonding portion to thereby bond the objective lens thereto, adjusting an inclination of an optical axis of the objective lens while causing the first bonding adhesive to deform, and applying a second bonding adhesive to the second bonding portion. The second bonding adhesive has a larger Young's modulus after curing than the first bonding adhesive.

Effect of the Invention

According to the present invention, after the objective lens is bonded using the first bonding adhesive, adjustment of the optical axis of the objective lens is performed utilizing a deformation of the first bonding adhesive, and then the objective lens is fixed using the second bonding adhesive. Therefore, the inclination of the optical axis of the objective lens can be adjusted with high degree of accuracy using a simple adjusting jig. As a result, a reliable objective lens driving apparatus can be achieved.

DESCRIPTION OF REFERENCE MARKS

11 . . . optical disk, 12 . . . first objective lens, 13 . . . second objective lens, 14 . . . lens holder, 14a . . . shaft-receiving hole, 14b . . . mounting hole, 14c . . . reference surface, 14d . . . groove portion, 14e . . . mounting hole, 14f . . . first contact surface, 14g . . . second contact surface, 14h . . . third contact surface, 14i . . . first groove, 14j . . . second groove, 14k . . . adjusting hole, 14m . . . adjusting hole, 15 . . . focusing coil, 16a, 16b . . . tracking coil, 17a, 17b . . . magnetic piece, 18 . . . electricity supply flexible printed board, 19 . . . base yoke, 20 . . . supporting shaft, 21a, 21b . . . focusing magnet, 22a-22d . . . tracking magnet, 23 . . . stopper, 24 . . . bonding adhesive, 25 . . . first bonding adhesive, 26 . . . second bonding adhesive, 27a, 27b . . . adjusting pin, 28 . . . tilt coil, 29 . . . relay board, 30 . . . wire, 31a, 31b . . . magnet, 32 . . . gel holder, 39 . . . base yoke.

BEST MODE FOR CARRYING OUT THE INVENTION

Embodiment 1

Figure 1:
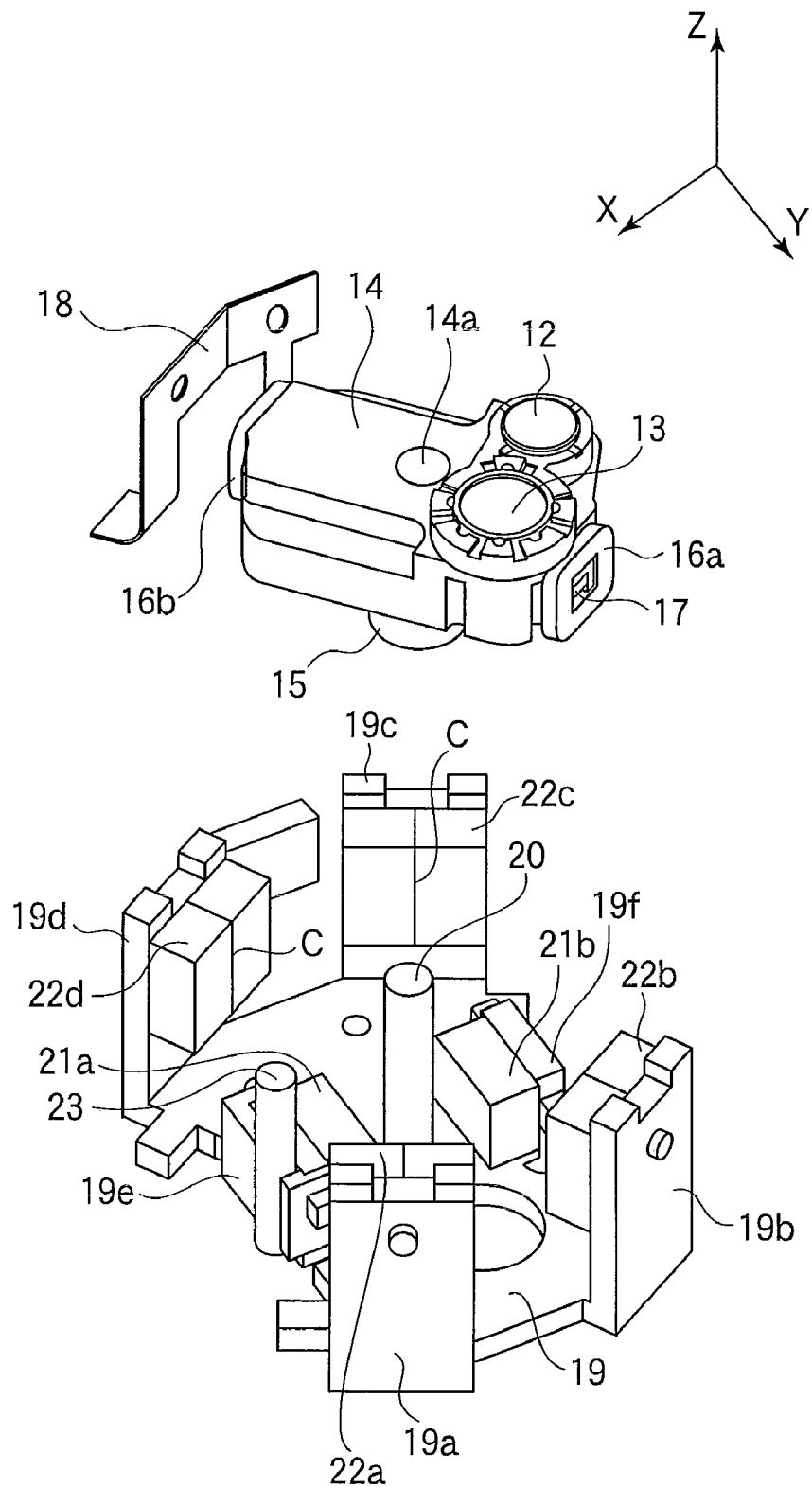
FIG. 1 is an exploded perspective view showing an objective lens driving apparatus according to Embodiment 1 of the present invention.
Figure 2:
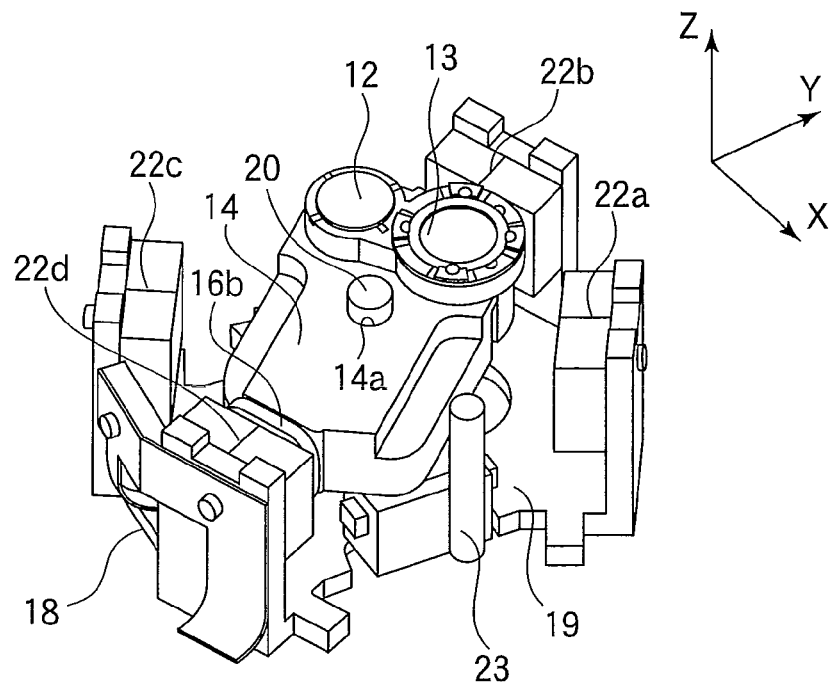
FIG. 2 is a perspective view showing the objective lens driving apparatus according to Embodiment 1 of the present invention.
Figure 3:
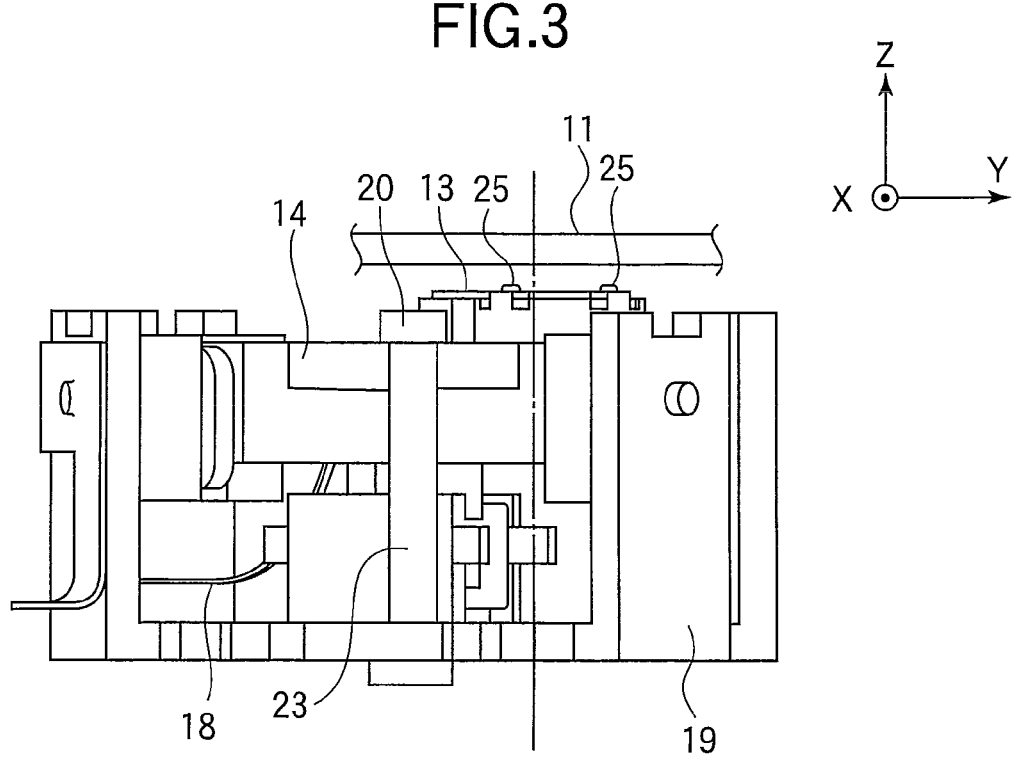
FIG. 3 is a side view showing the objective lens driving apparatus according to Embodiment 1 of the present invention.
Figure 4:
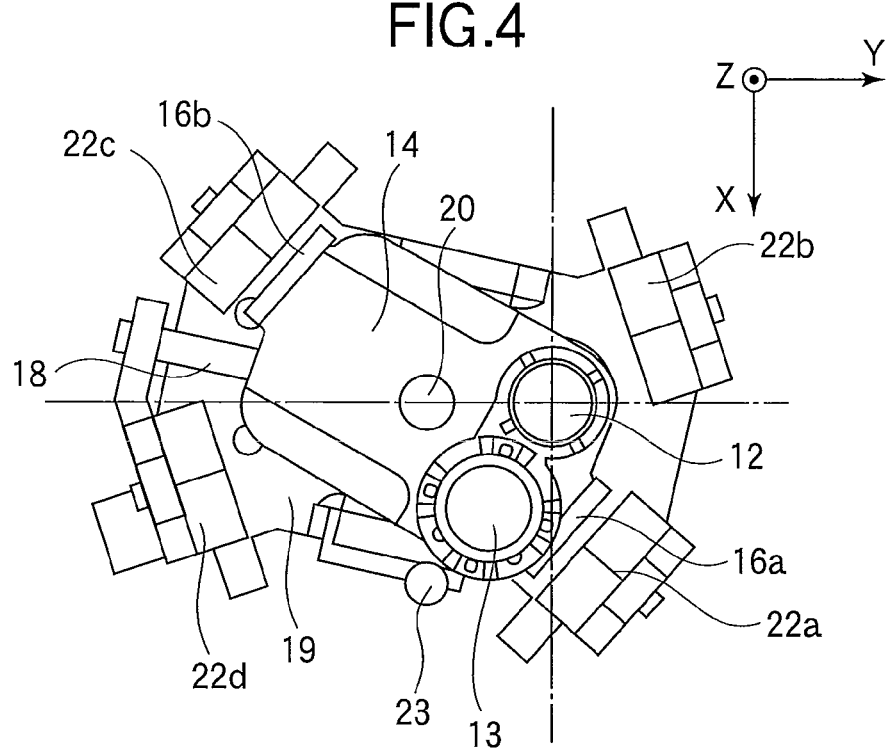
FIG. 4 is a perspective view showing the objective lens driving apparatus according to Embodiment 1 of the present invention in a state where a first objective lens is selected.
Figure 5:
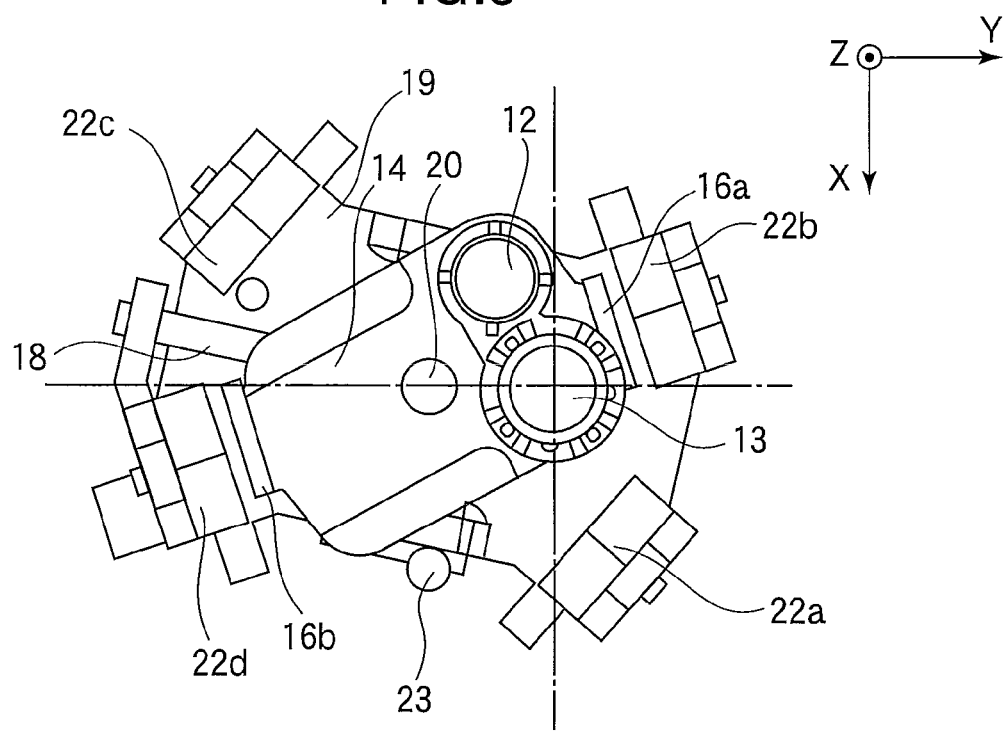
FIG. 5 is a perspective view showing the objective lens driving apparatus according to Embodiment 1 of the present invention in a state where a second objective lens is selected.

FIG. 1 is an exploded perspective view showing an objective lens driving apparatus according to Embodiment 1 of the present invention divided into a movable part and a stationary part. FIG. 2 is a perspective view showing the objective lens driving apparatus in which the movable part and the stationary part shown in FIG. 1 are assembled. FIG. 3 is a side view showing the objective lens driving apparatus of FIG. 2. FIG. 4 is a plan view showing the objective lens driving apparatus shown in FIG. 2 in a state where a first objective lens is selected. FIG. 5 is a plan view showing the objective lens driving apparatus shown in FIG. 2 in a state where a second objective lens is selected.

Here, a direction perpendicular to a recording surface of an optical disk is defined as Z direction. Along the direction, a direction from an objective lens toward the optical disk is defined as +Z direction (upward), and its opposite direction is defined as −Z direction (downward). Furthermore, a direction passing through a rotation center of a lens holder 14 described later and extending in a radial direction of the optical disk is defined as X direction. A direction perpendicular to both of the X direction and the Z direction is defined as Y direction.

The optical disk 11 (FIG. 3, FIG. 17) is a medium on which information can be recorded or from which information can be reproduced. Here, different kinds of optical disks 11 such as, for example, BD (Blu-Ray Disc), CD (Compact Disc) and DVD (Digital Versatile Disc) are used.

As shown in FIG. 1, the objective lens driving apparatus includes a first objective lens 12 and a second objective lens 13 corresponding to different kinds of optical disks 11. The first objective lens 12 is a BD-objective lens that collects a light flux having a wavelength in the vicinity of 405 nm on the optical disk 11, the light flux being emitted from a blue semiconductor laser (not shown). The second objective lens 13 is a CD/DVD compatible lens that has two focal lengths and collects a red light flux having a wavelength in the vicinity of 660 nm and an infrared light flux having a wavelength in the vicinity of 780 nm on the optical disk 11, the red light flux and the infrared light flux being emitted from a dual-wavelength semiconductor laser (not shown).

The light fluxes emitted from the respective semiconductor lasers proceed along a common light path toward the optical disk 11 via not shown optical components. The first objective lens 12 and the second objective lens 13 are selectively disposed in the light path according to the kind of the optical disk 11 to be used. The blue semiconductor laser and the dual-wavelength semiconductor laser are controlled to selectively emit light according to the kind of the optical disk 11 to be used.

The first and second objective lenses 12 and 13 are mounted to the lens holder 14. The lens holder 14 is formed of a lightweight plastic having high rigidity. A shaft-receiving hole 14a in the Z direction is formed at a center of the lens holder 14.

Further, two mounting holes (described later) are formed on the lens holder 14 for mounting the first and second objective lenses 12 and 13. The first and second objective lenses 12 and 13 are fixed to the respective mounting holes of the lens holder 14 by means of bonding so that respective optical axes are parallel to an axial line of the shaft-receiving hole 14a, are shifted from the axial line by the same distance, and form a predetermined angle about the axial line.

A cylindrical focusing coil 15 and a pair of rectangular tracking cols 16a and 16b are fixed to the lens holder 14 by means of bonding. Furthermore, magnetic pieces 17 are fixed to the lens holder 14 in the vicinities of center rectangular openings (inside of wound portions) of the tracking coils 16a and 16b by means of bonding (one of the magnetic pieces 17 on the tracking coil 16b side is not shown). For supplying electricity to the focusing coil 15 and the tracking coils 16a and 16b, an end of the flexible printed board 18 is fixed to the lens holder 14. These components constitute a movable part.

The lens holder 14 is supported by a base yoke 19 formed of a magnetic material such as cold rolling steel sheet by means of press forming. A supporting shaft 20 of the Z direction is provided upright on a center of the base yoke 19. A pair of wall portions 19e and 19f are formed on the base yoke 19 so as to sandwich the supporting shaft 20 in the X direction. A pair of focusing magnets 21a and 21b which are parallel-magnetized are fixed to facing surfaces of the wall portions 19e and 19f.

A pair of wall portions 19a and 19b facing the supporting shaft 20 are formed on the base yoke 19 on one side with respect to the supporting shaft 20 in the Y direction. Another pair of wall portions 19c and 19d facing the supporting shaft 20 are formed on the base yoke 19 on the other side with respect to the supporting shaft 20 in the Y direction. Tracking magnets 22a and 22b are fixed to surfaces of the walls portions 19a and 19b facing the supporting shaft 20 side. Tracking magnets 22c and 22d are fixed to surfaces of the walls portions 19c and 19d facing the supporting shaft 20 side. Each of the tracking magnets 22a, 22b, 22c and 22d is magnetized into two poles so as to have magnetic pole surfaces having opposite polarities on a left side and a right side of a center line C of each tracking magnet.

An angle between a line connecting a center of the tracking magnet 22a and a center of the supporting shaft 20 and a line connecting a center of the tracking magnet 22b and the center of the supporting shaft 20 is equal to an angle between a line connecting a center (optical axis) of the first objective lens 12 and a center of the shaft-receiving hole 14a and a line connecting a center of the second objective lens 13 and the center of the shaft-receiving hole 14a. Similarly, an angle between a line connecting a center of the tracking magnet 22c and the center of the supporting shaft 20 and a line connecting a center of the tracking magnet 22d and the center of the supporting shaft 20 is equal to an angle between the line connecting the center of the first objective lens 12 and the center of the shaft-receiving hole 14a and the line connecting the center of the second objective lens 13 and the center of the shaft-receiving hole 14a.

A stopper 23 formed of a plastic material having high internal attenuation is fixed by means of bonding or screw to a backside of the wall portion 19e to which the focusing magnet 21a is fixed. These components constitute a stationary part. The stationary part and the movable part constitute the objective lens driving apparatus (FIG. 2, FIG. 3).

The shaft-receiving hole 14a of the lens holder 14 engages the supporting shaft 20. Further, the above described pair of magnetic pieces 17 are fixed to the lens holder 14. Due to the magnetic pieces 17, a magnetic attractive force is generated toward a center of the tracking magnets 22a and 22c (or the tracking magnets 22b and 22d) facing the magnetic piece 17, so that the lens holder 14 is resiliently forced toward a reference position in the Z direction and a reference position in a rotational direction about the supporting shaft 20 (referred to as a rotational reference position). In this state, the focusing coil 15 faces the focusing magnets 21a and 21b, and the tracking coils 16a and 16b face the tracking magnets 22a and 22c (or the tracking magnets 22b and 22d).

In a state shown in FIG. 4, the pair of magnetic pieces 17 (not shown in FIG. 4) and the tracking coils 16a and 16b face the tracking magnets 22a and 22c. In this state, the first objective lens 12 is selected, and is disposed on the light path. In a state shown in FIG. 5, the pair of magnetic pieces 17 (not shown in FIG. 5) and the tracking coils 16a and 16b face the tracking magnets 22b and 22d. In this state, the second objective lens 13 is selected, and is disposed on the light path. In this regard, an end of the electricity supply flexible printed board 18 opposite to a side fixed to the lens holder 14 is fixed to the base yoke 19.

An operation of the above configured objective lens driving apparatus will be described.

First, in order to control a focus error of the light spot, a focus control current flows through the focusing coil 15 via the electricity supply flexible printed board 18. An interaction between the focus control current and a magnetic field caused by the focusing magnets 21a and 21b generates an electromagnetic force in the Z direction, and the lens holder 14 moves along the supporting shaft 20 in the Z direction. As a result, the objective lenses 12 and 13 held by the lens holder 14 move toward and away from the optical disk 11, so that controlling of the focus error of the light spot is performed. After application of current to the focusing coil 15 is stopped, the lens holder 14 returns to the reference position in the Z direction due to the magnetic attractive force acting on the pair of magnetic pieces 17.

In order to control a tracking error of the light spot, a tracking control current flows through the tracking coils 16a and 16b via the electricity supply flexible printed board 18. An interaction between the tracking control current and a magnetic field caused by the tracking magnets 22a and 22c or the tracking magnets 22b and 22d generates an electromagnetic force to rotate the lens holder 14 about the supporting shaft 20, so that the lens holder 14 rotates about the supporting shaft 20. As a result, the objective lens 12 or 13 held by the lens holder 14 (to be more specific, the first objective lens selected in FIG. 4 or the second objective lens 13 selected in FIG. 5) moves substantially in the radial direction (i.e., the X direction) of the optical disk 11, so that controlling of the tracking error of the light spot is performed. After application of current to the tracking coils 16a and 16b is stopped, the lens holder 14 returns to the reference position in the rotational direction due to the magnetic attractive force acting on the pair of magnetic pieces 17.

Next, a method for switching the objective lenses disposed on the light path will be described.

In order to switch from a state where the first objective lens 12 is selected (FIG. 4) to a state where the second objective lens 13 is selected (FIG. 5), a following operation is performed. As shown in FIG. 4, in a state where the first objective lens 12 is selected, the tracking coils 16a and 16b face the tracking magnets 22a and 22c. In this state, when a predetermined pulsed switching current flows through the tracking coils 16a and 16b via the electricity supply flexible printed board 18, an interaction between the switching current and the magnetic field caused by the tracking magnets 22a and 22c generates an electromagnetic force, so that the lens holder 14 is applied with a pulsed rotational force to rotate about the supporting shaft 20 in a counterclockwise direction in the figure. When the lens holder 14 rotates to reach a position (FIG. 5) where the tracking coils 16a and 16b substantially face the tracking magnets 22b and 22d, application of current to the tracking coils 16a and 16b is stopped. In this state, the magnetic attractive force caused by the tracking magnet 22b and 22d acts on the pair of magnetic pieces 17, so that the lens holder 14 stops at the rotational reference position shown in FIG. 5.

In order to switch from a state where the second objective lens 13 is selected (FIG. 5) to a state where the first objective lens 12 is selected (FIG. 4), a following operation is performed. When a pulsed switching current having opposite polarity flows through the tracking coils 16a and 16b via the electricity supply flexible printed board 18, an interaction between the switching current and the magnetic field caused by the tracking magnets 22b and 22d generates an electromagnetic force, so that the lens holder 14 is applied with a pulsed rotational force to rotate about the supporting shaft 20 in a clockwise direction in the figure. When the lens holder 14 rotates to reach a position (FIG. 4) where the tracking coils 16a and 16b substantially face the tracking magnets 22a and 22c, application of current to the tracking coils 16a and 16b is stopped. In this state, the magnetic attractive force caused by the tracking magnet 22a and 22c acts on the pair of magnetic pieces 17, so that the lens holder 14 stops at the rotational reference position shown in FIG. 4.

When the lens holder 14 rotates beyond the rotational reference positions shown in FIGS. 4 and 5, a side surface of the lens holder 14 contacts the stopper 23 provided on the base yoke 19, so as to prevent overrun of the lens holder 14. In other words, the stopper 23 has a function to restrict a rotational range (a rotating amount) of the lens holder 14.

Figure 6:
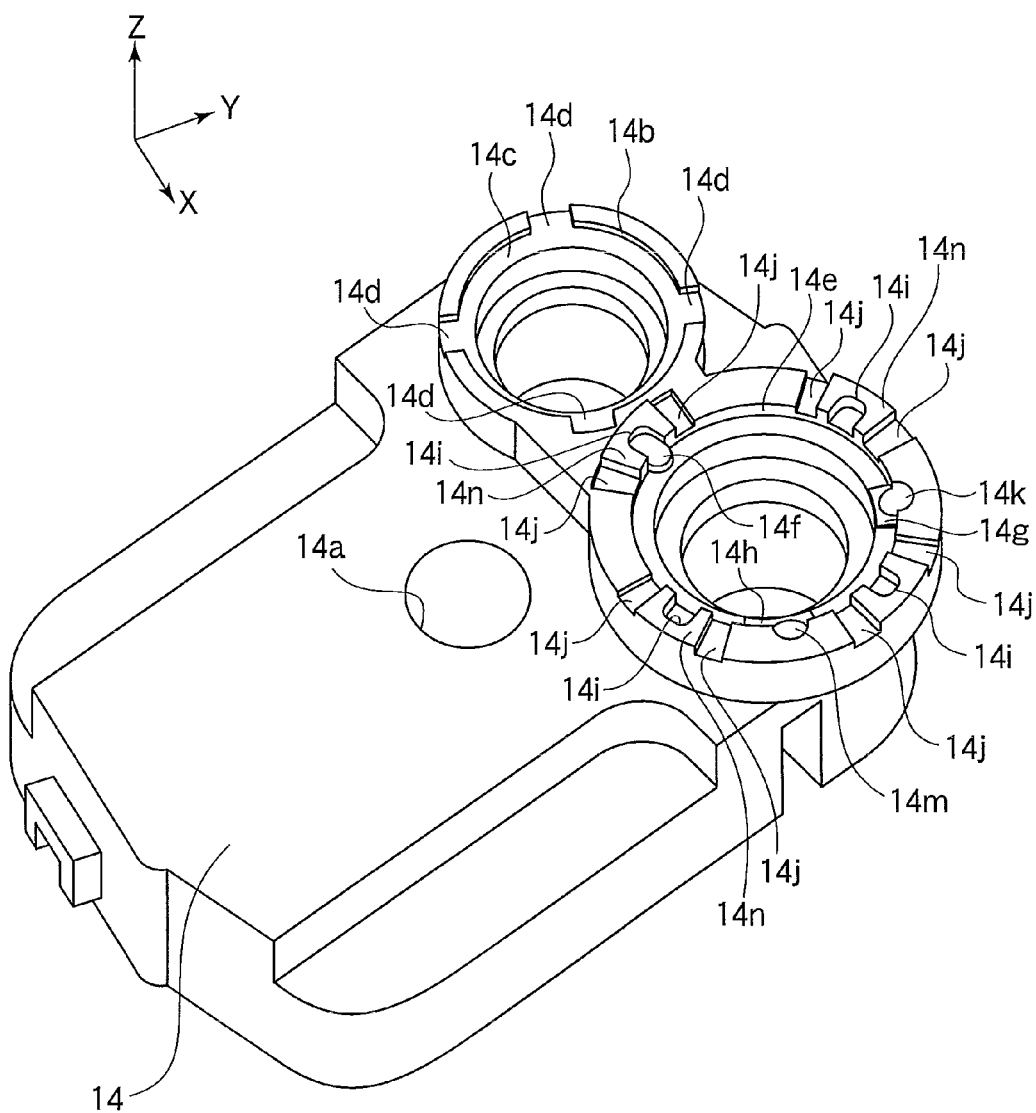
FIG. 6 is a perspective view showing a lens holder according to Embodiment 1 of the present invention.
Figure 7:
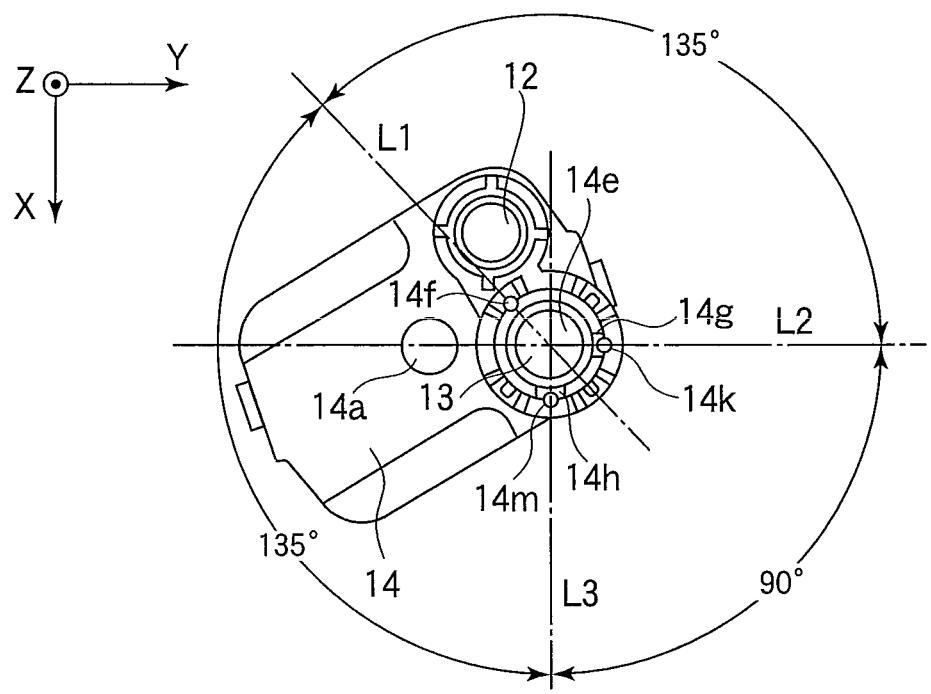
FIG. 7 is a plan view showing the lens holder according to Embodiment 1 of the present invention.
Figure 8:
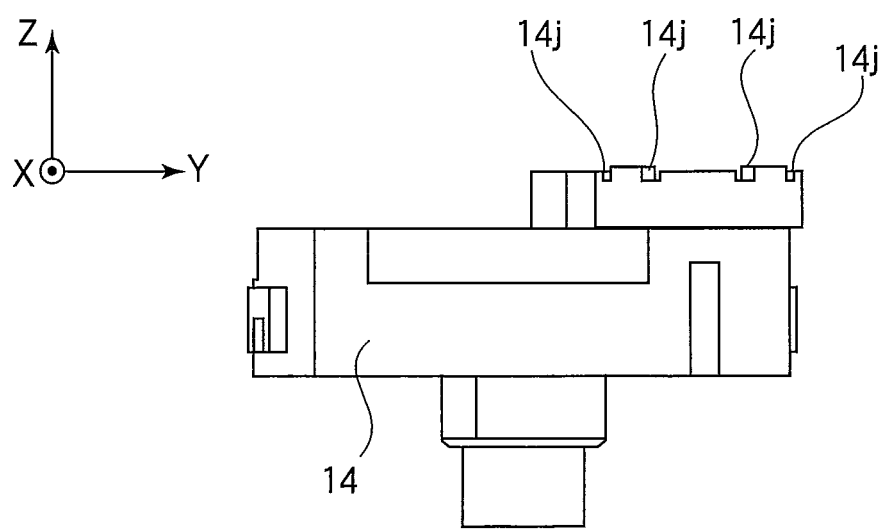
FIG. 8 is a side view showing the lens holder according to Embodiment 1 of the present invention.
Figure 9:
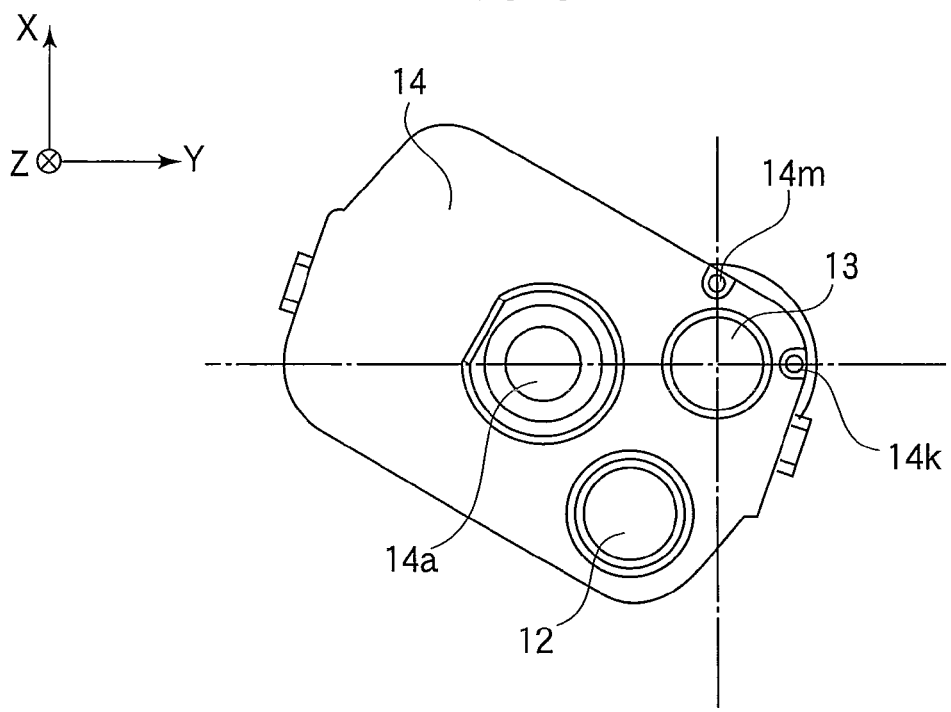
FIG. 9 is a bottom view showing the lens holder according to Embodiment 1 of the present invention.

Next, a configuration for fixing the first objective lens 12 and the second objective lens 13 will be described in detail. FIG. 6 is a perspective view showing the lens holder according to Embodiment 1. FIG. 7 is a plan view showing the lens holder of FIG. 6. FIG. 8 is a side view showing the lens holder of FIG. 6. FIG. 9 is a bottom view showing the lens holder of FIG. 6.

As shown in FIGS. 6 through 9, the lens holder 14 has a mounting hole 14b for mounting the first objective lens 12. The mounting hole 14b has a center axial line directed in the Z direction, and is configured to engage an outer periphery of the first objective lens 12. Inside the mounting hole 14b, a reference surface 14c, which is perpendicular to an axial direction of the mounting hole 14b (i.e., the Z direction), is formed in a ring shape. A plurality of (in this example, four) groove portions 14d are formed on a cylindrical-shaped wall portion of the mounting hole 14b at constant intervals for applying a bonding adhesive.

Further, the lens holder 14 has a mounting hole 14e for mounting the second objective lens 13. The mounting hole 14e has a center axial line directed in the Z direction, and is configured to engage an outer periphery of the second objective lens 13. Inside the mounting hole 14e, a first contact surface 14f providing a reference of height in the direction of the optical axis of the second objective lens 13 (i.e., the Z direction) is formed, and a second contact surface 14g and a third contact surface 14h disposed at a lower position than the first contact surface 14f are formed. These three contact surfaces 14f, 14g and 14h are surfaces perpendicular to the axial direction of the mounting hole 14e (i.e., the Z direction).

As shown in FIG. 7, a line L1 connecting the first contact surface 14f and the center of the mounting hole 14e, a line L2 connecting the second contact surface 14g and the center of the mounting hole 14e, and a line L3 connecting the third contact surface 14f and the center of the mounting hole 14e are defined. An angle between the line L1 and the line L2 and an angle between the line L3 and the line L1 are both 135 degrees. An angle between the line L2 and the line L3 is 90 degrees.

Referring back to FIG. 6, a plurality of (in this example, four) first grooves 14i are formed on the cylindrical-shaped wall portion of the mounting hole 14e at substantially constant intervals for applying the bonding adhesive. The first grooves 14i are grooves leading to an inner side of the mounting hole 14e. Surrounding portions 14n of the first grooves 14i are formed to be higher than other part of a wall portion surrounding the mounting hole 14e (i.e., so as to protrude toward the disk 11 side). The above described first contact surface 14f is formed on the bottom of one first groove 14i among the four first grooves 14i.

Second grooves 14j are formed on both sides of each first groove 14i in the circumferential direction. In this example, a total of eight second grooves 14j are formed respectively on both sides of four first grooves 14i. The second grooves 14j lead to an inner side of the mounting hole 14e, and extend in radial direction of the mounting hole 14e.

An adjusting hole 14k in the Z direction is formed from the second contact surface 14g. An adjusting hole 14m in the Z direction is formed from the third contact surface 14h. As shown in FIG. 7, the adjusting holes 14k and 14m are formed on extension lines extending from the optical axis of the second objective lens 13 in the X direction (a radial direction of the optical disk 11) and in the Y direction (a tangential direction of the optical disk 11) in a state where the second objective lens 13 is selected.

Figure 10:
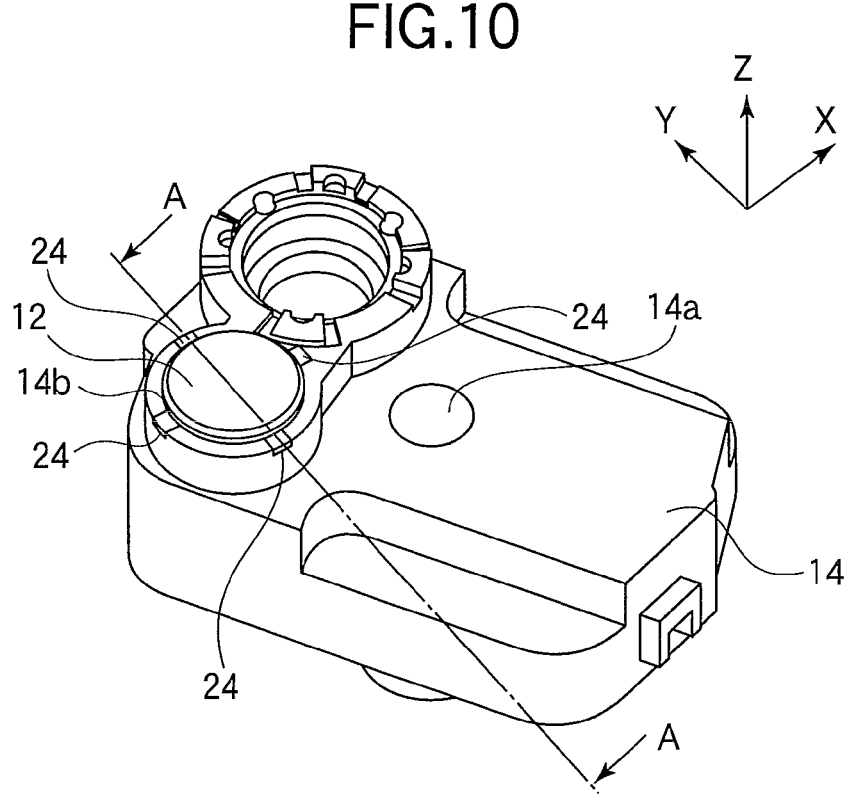
FIG. 10 is a perspective view showing the lens holder according to Embodiment 1 of the present invention in a state where the first objective lens is mounted thereto.
Figure 11:
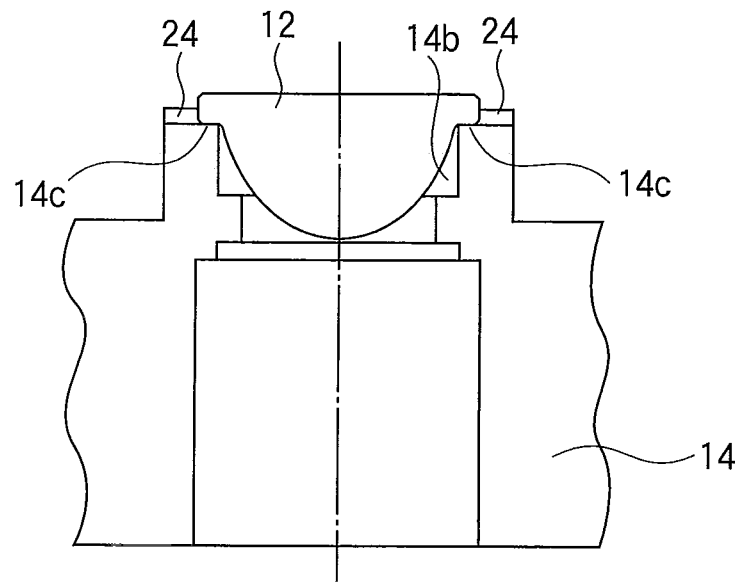
FIG. 11 is a sectional view of the lens holder taken along line A-A in FIG. 10.

Here, a bonding method of the first objective lens 12 will be described with reference to FIGS. 10 and 11. FIG. 10 is a perspective view showing a state where the first objective lens 12 is set to the lens holder 14 and a bonding adhesive 24 is applied thereto. FIG. 11 is a sectional view taken along line A-A shown in FIG. 10. First, as shown in FIG. 10, the first objective lens 12 is inserted into the mounting hole 14b of the lens holder 14 from above, so that a lower surface in the vicinity of the outer periphery of the lens holder 14 contacts the mounting reference surface 14c. In this state, the ultraviolet curable bonding adhesive 24 is applied to the outer periphery of the first objective lens 12 and four groove portions 14d. Further, the bonding adhesive 24 is irradiated with ultraviolet rays to be cured, so that the first objective lens 12 is fixed to the mounting hole 14b of the lens holder 14. In this regard, when the first objective lens 12 is fixed to the lens holder 14, an adjustment of an inclination of the optical axis is not performed. Therefore, an accuracy of an inclination of the optical axis of the first objective lens 12 depends on accuracies of respective components.

Figure 12:
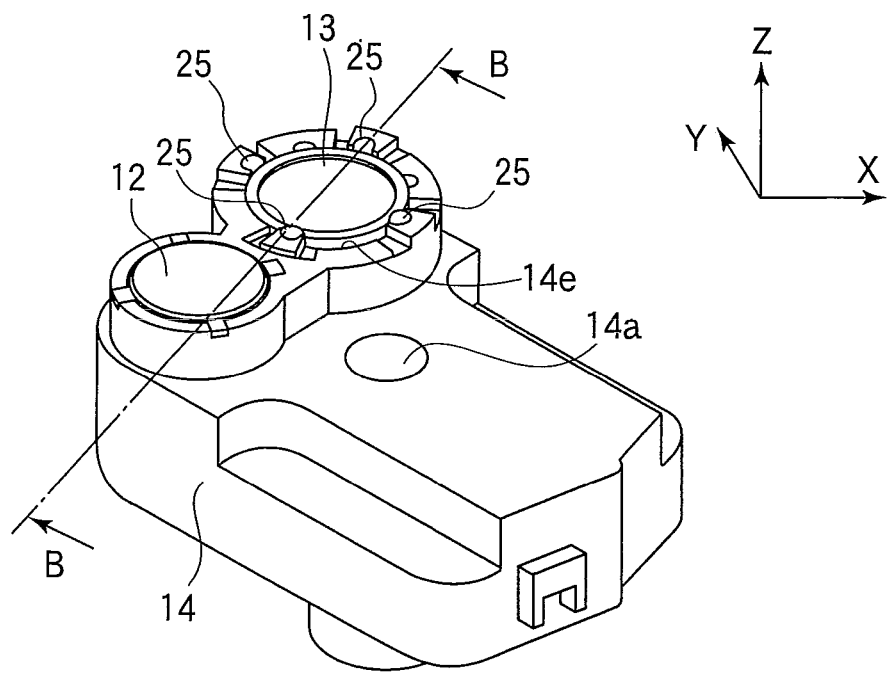
FIG. 12 is a perspective view showing the lens holder according to Embodiment 1 of the present invention in a state where the second objective lens is mounted thereto using a first bonding adhesive.
Figure 13:
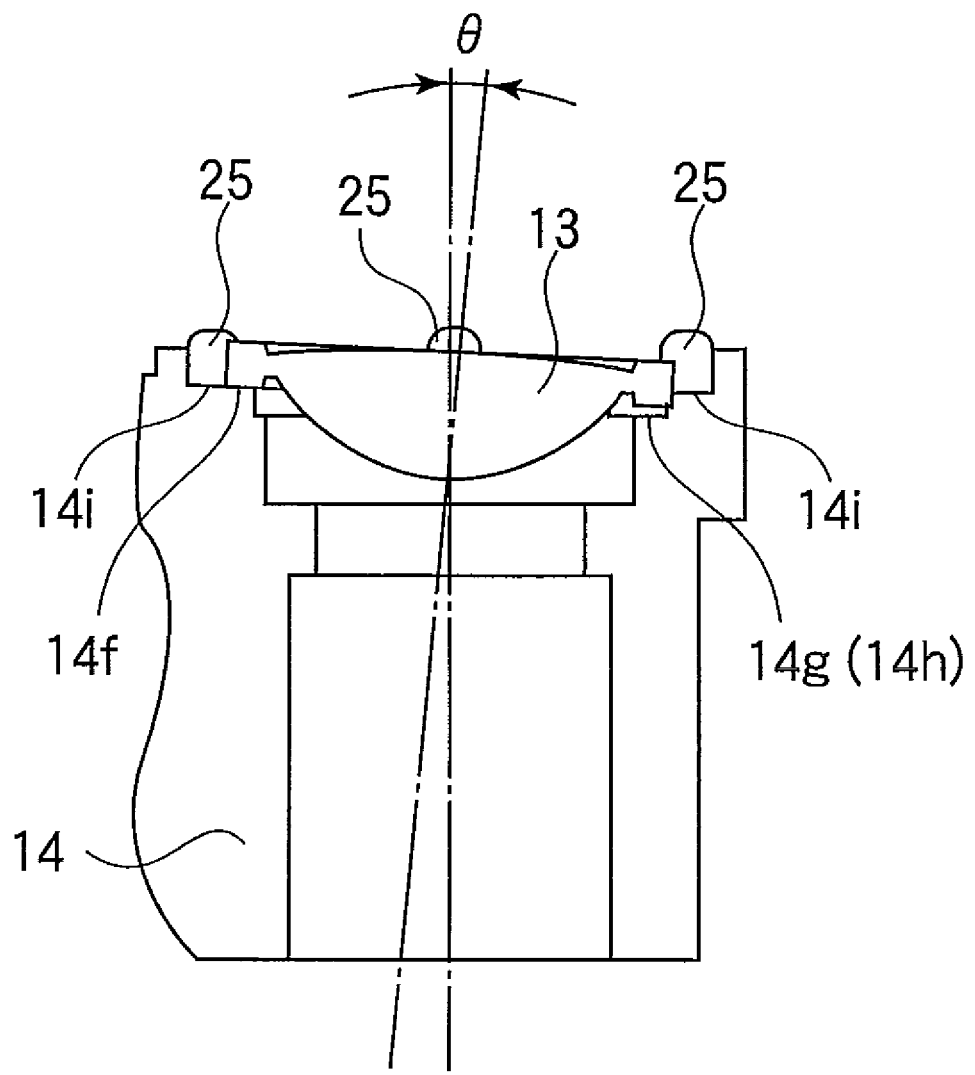
FIG. 13 is a sectional view of the lens holder taken along line B-B in FIG. 12.

Next, a bonding method of the second objective lens 13 will be described with reference to FIGS. 12 and 13. FIG. 12 is a perspective view showing a state where the second objective lens 13 is set to the lens holder 14 and a first bonding adhesive 25 is applied thereto. FIG. 13 is a sectional view taken along line B-B in FIG. 12. As shown in FIG. 12, the second objective lens 13 is inserted into the mounting hole 14e of the lens holder 14 from above, so that a lower surface in the vicinity of an outer periphery of the second objective lens 13 contacts three portions: the first contact surface 14f, the second contact surface 14g and the third contact surface 14h. In this state, the optical axis of the second objective lens 13 is inclined with respect to the Z direction, due to a difference between the height of the first contact surface 14f and the height of the second and third contact surfaces 14g and 14h. To be more specific, in a state (a state shown in FIG. 7) where the second objective lens 13 is selected, the optical axis of the second objective lens is inclined at a predetermined angle θ toward a direction (a direction shown by the line L1 in FIG. 7) at degrees with respect to the X direction through the optical axis of the second objective lens 13.

In this state, the first bonding adhesive 25 is applied to the four first grooves 14i. In this state, the first bonding adhesive 25 is coated so that an upper surface thereof protrudes with respect to upper surfaces of the first objective lens 12 and the second objective lens 14. In this regard, the first bonding adhesive 25 is a room temperature curable silicone rubber based resin (RTV (Room Temperature Vulcanization) rubber) or ultraviolet curable silicone rubber based resin, and has a rubber-like resiliency after curing.

Figure 14A:
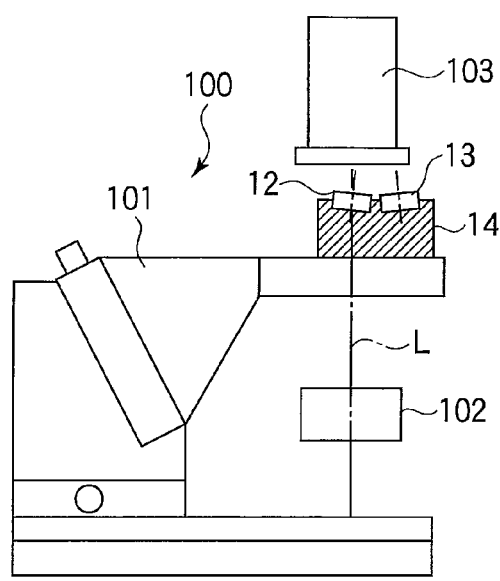
FIGS. 14(A) through 14(D) show an adjusting method of an optical axis of a second objective lens according to Embodiment 1 of the present invention.

FIGS. 14A through 14D are views for illustrating a method for adjusting an inclination of the optical axis of the second objective lens 13. In this example, a known gonio stage 100 (see, for example, Japanese Laid-open Patent Publication No. 2001-160239) is used. First, as shown in FIG. 14(A), the lens holder 14 with the first and second objective lenses 12 and 13 having already been mounted is fixed onto an adjustable table 101 of the gonio stage 100. A light source 102 is disposed below the lens holder 14 held on the adjustable table 101. Furthermore, an optical axis inclination measuring apparatus 103 having an objective lens (not shown) is disposed above the lens holder 14. An optical axis of a light emitted by the light source 102 and incident on the measuring apparatus 103 is referred to as an apparatus optical axis L.

As described above, the optical axis of the first objective lens 12 fixed to the lens holder 14 has not yet been adjusted, and therefore there is a possibility that the optical axis of the first objective lens 12 may be inclined with respect to the apparatus optical axis L.

Figure 14B:
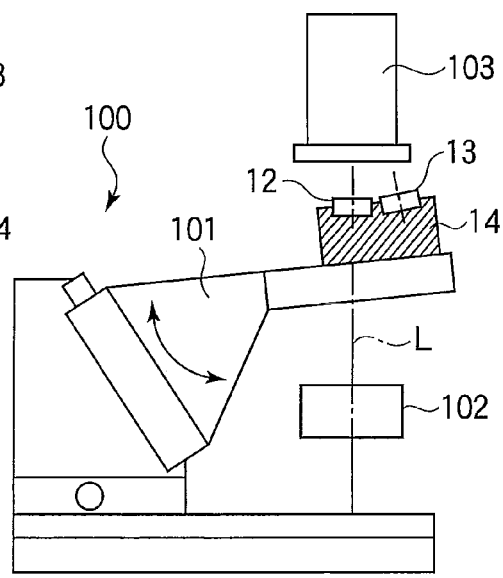

In this state, the light source 102 emits a light flux, and an imaging element of the optical axis inclination measuring apparatus 103 takes an image of a light spot formed by the light flux passing the first objective lens 12. Aberration is determined based on a shape of the light spot, and an inclination amount of the optical axis of the first objective lens 12 is calculated based on the aberration. Next, as shown in FIG. 14(B), an inclination of the adjustable table 101 of the gonio stage 100 is adjusted (i.e., an inclination of the lens holder as a whole is adjusted) in accordance with the inclination amount of the optical axis, so that the inclination of the optical axis of the first objective lens 12 becomes zero (parallel to the apparatus optical axis L).

Figure 14C:
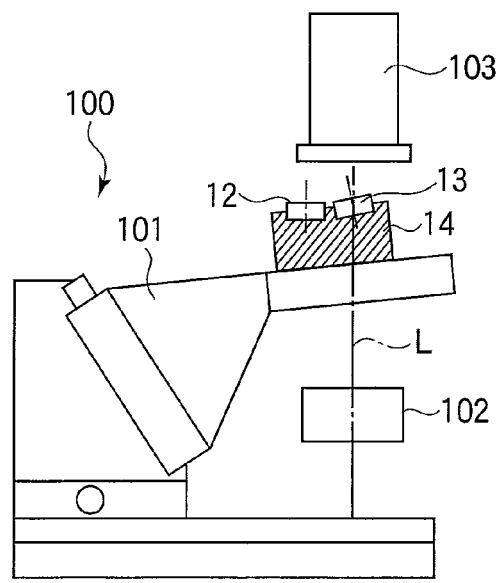

Next, as shown in FIG. 14(C), the adjustable table 101 of the gonio stage 100 is moved without changing the inclination so as to bring the second lens 13 on the optical axis L between the light source 102 and the optical axis inclination measuring apparatus 103. In this regard, the light source 102 is switched to a light source that emits a light flux having a wavelength corresponding to the second objective lens 13. Furthermore, the objective lens of the optical axis inclination measuring apparatus 103 is switched to an objective lens for collecting the light flux corresponding to the second objective lens 13.

In this state, the light source 102 emits light, and the imaging element of the optical axis inclination measuring apparatus 103 takes an image of a light spot formed by the light flux passing the second objective lens 13. Aberration is determined based on a shape of the light spot, and an inclination amount of the optical axis of the second objective lens 13 is calculated based on the aberration. Then, the optical axis of the second objective lens 13 with respect to the lens holder 14 is adjusted so that the inclination of the optical axis of the second objective lens 13 becomes 0.

Figure 15:
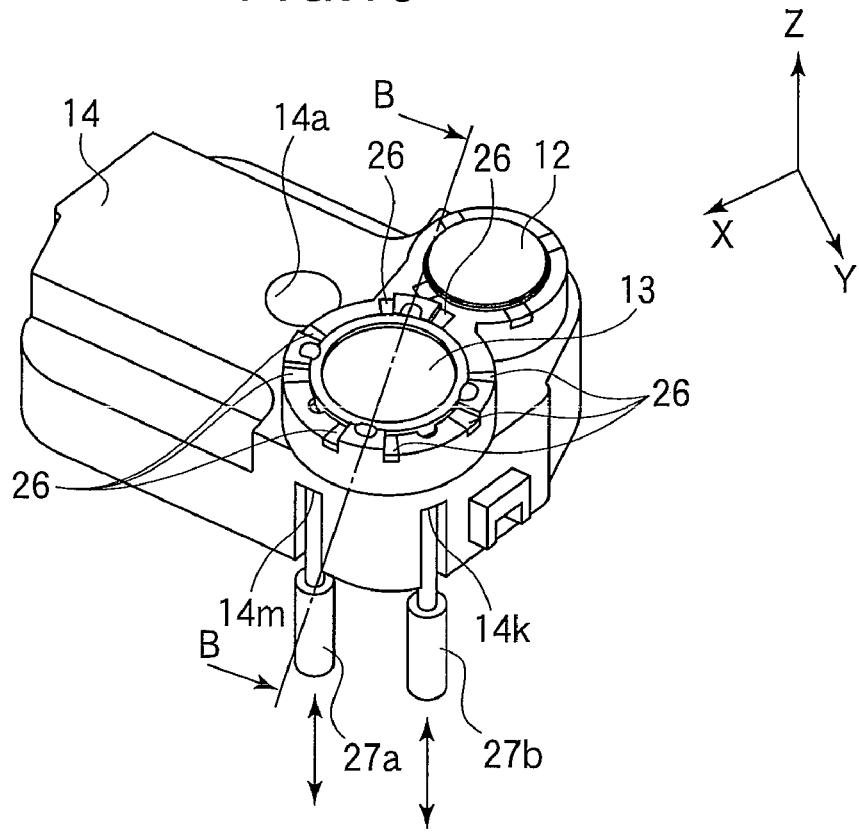
FIG. 15 is a perspective view showing a state where the inclination of the optical axis of the second objective lens is adjusted, and the second objective lens is fixed using a second bonding adhesive according to Embodiment 1 of the present invention.
Figure 16:
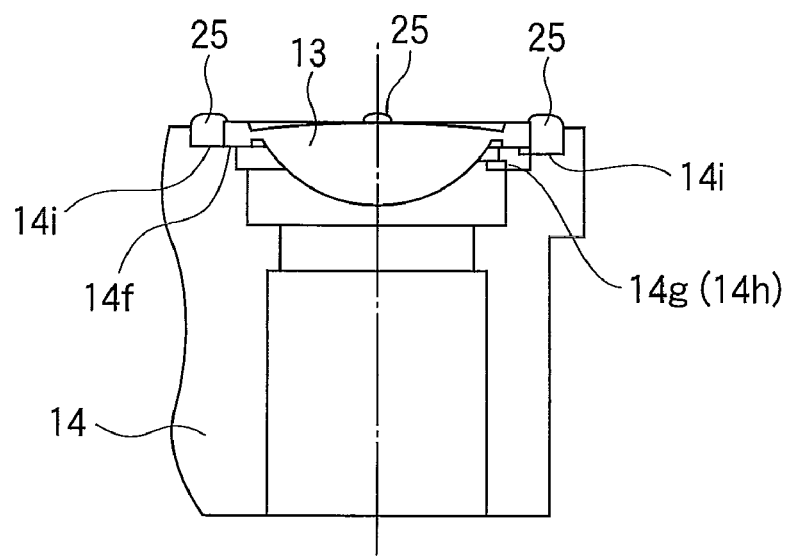
FIG. 16 is a sectional view of the lens holder taken along line B-B in FIG. 15.

Next, a process for adjusting the inclination of the optical axis of the second objective lens 13 shown in FIG. 14(C) will be described further. FIG. 15 is a perspective view for illustrating the process for adjusting the inclination of the optical axis of the second objective lens 13 as shown in FIG. 14(C). FIG. 16 is a sectional view taken along line B-B shown in FIG. 15. As described above, the inclination of the optical axis of the second objective lens 13 is measured by the optical axis inclination measuring apparatus 103 (FIG. 14(C)).

Next, adjusting pins 27a and 27b are inserted into adjusting holes 14k and 14m of the lens holder 14 from below. Using the adjusting pins 27a and 27b, a position of the lower surface in the vicinity of the outer periphery of the second objective lens 13 contacting the second contact surface 14g and the third contact surface 14h is adjusted vertically (in the Z direction). In this state, the second objective lens 13 is resiliently held by the first bonding adhesive 25 at four positions, and therefore the inclination of the optical axis can be adjusted about the first contact surface 14f. When the inclination of the optical axis of the second objective lens 13 measured by the above described optical axis inclination measuring apparatus becomes 0, the positions of the adjusting pins 27a and 27b are fixed. In this state, the second bonding adhesive 26 is applied to the second grooves 14j (FIG. 6), and the second bonding adhesive 26 is irradiated with ultraviolet rays to be cured, with the result that the second objective lens 13 is fixed to the lens holder 14. In this regard, the adjustable table 101 of the gonio stage 100 has a shape through which the above described adjustment can be performed using the adjusting pins 27a and 27b.

The second bonding adhesive 26 is a ultraviolet curable bonding adhesive having a larger Young' modulus after curing than the first bonding adhesive 25. In this example, the second bonding adhesive 26 is the same as the ultraviolet curable bonding adhesive 24 used for fixing the first objective lens 12.

Figure 14D:
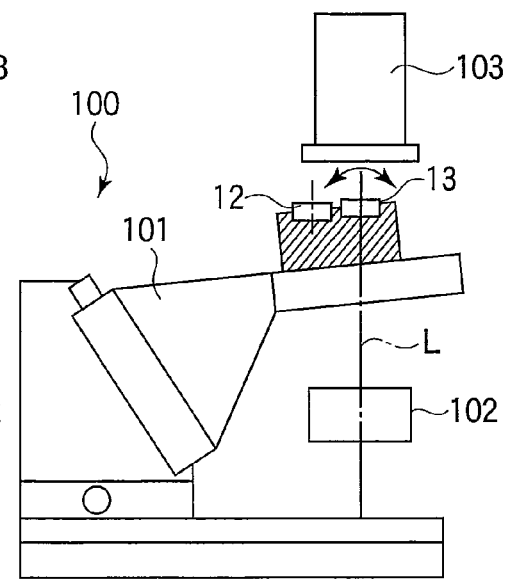

With the above described process, the first objective lens 12 and the second objective lens 13 are fixed to the lens holder 14 so that optical axes thereof are parallel to each other as shown in FIG. 14(D).

Figure 17:
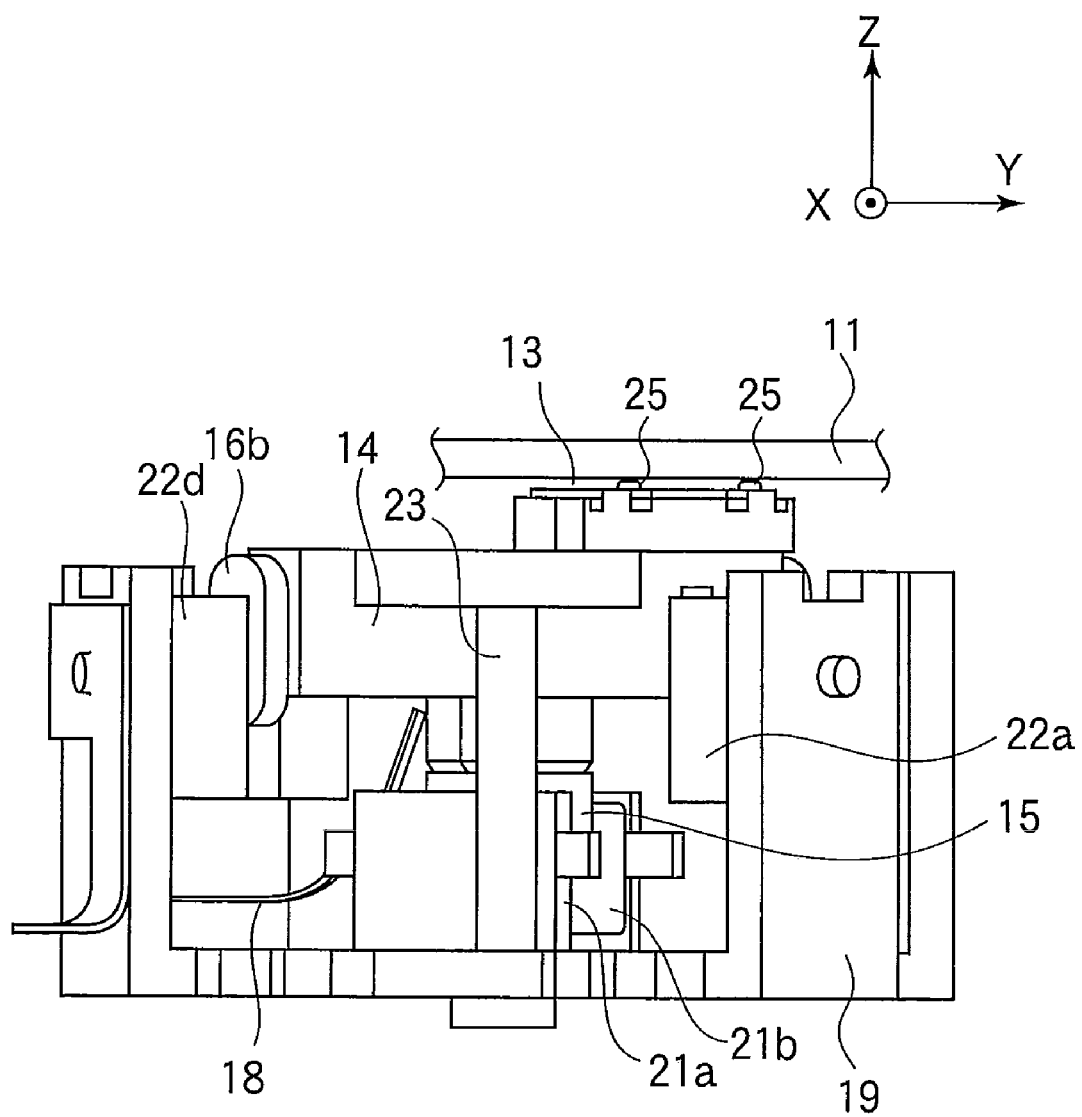
FIG. 17 is a side view showing a state where a movable part of the lens holder contacts an optical disk according to Embodiment 1 of the present invention.

FIG. 17 is a side view showing a positional relationship between the lens holder 14 and the optical disk 11 in a state where the lens holder 14 contacts the optical disk 11. In the lens holder 14, the first bonding adhesive 25 having rubber-like resiliency protrudes upward with respect to the upper surfaces of the first objective lens 12 and the second objective lens 13. Therefore, when the lens holder 14 moves to the optical disk 11 side (+Z direction), the first bonding adhesive 25 first contacts the optical disk 11 so as to prevent the first and second objective lenses 12 and 13 from contacting the optical disk 11.

As described above, according to this embodiment, the lens holder 14 has the first grooves 14i and the second grooves 14j, and the first bonding adhesive 25 is applied to the first grooves 14i. Further, the inclination of the optical axis of the second objective lens 13 is adjusted utilizing the resilient deformation of the first bonding adhesive 25, and then the second bonding adhesive 26 having a larger Young's modulus than the first bonding adhesive 25 is applied to the second grooves 14j, so that the second objective lens 13 is fixed to the lens holder 14. Therefore, the adjustment of the optical axis can be performed with a high degree of accuracy using a simple jig, without using a large-scale adjusting apparatus (a manipulator or the like) that positions the objective lens with respect to the lens holder with a high degree of accuracy.

Furthermore, the first bonding adhesive 25 protrudes with respect to the upper surfaces of the first objective lens 12 and the second objective lens 13. Therefore, when the lens holder 14 moves toward the optical disk 11 side, the first bonding adhesive 25 contacts the optical disk 11 and prevents the first objective lens 12 and the second objective lens 13 from contacting the optical disk 11.

Further, the first bonding adhesive 25 contains silicone rubber and has resilience and softness. Therefore, the adjustment of the optical lens of the second objective lens 13 becomes easy, and damage and generation of abrasion powder can be prevented even when the first bonding adhesive 25 contacts the optical disk 11, so that a reliable objective lens deriving apparatus can be obtained.

In addition, the second objective lens 13 is preliminarily received at three positions, i.e., the first contact surface 14f and the second and third contact surfaces 14g and 14h lower than the first contact surface 14f, in such a manner that the optical axis of the second objective lens 13 is inclined at the angle θ. Therefore, the inclination of the optical axis of the second objective lens 13 is adjusted simply by pushing the adjusting pins 27a and 27b in one direction. As a result, the optical axis of the objective lens can be adjusted with high degree of accuracy using a simpler jig.

Furthermore, the lens holder 14 is provided with the adjusting holes 14k and 14m, and therefore the adjusting pins 27a and 27b can be inserted from the lower side of the lens holder 14 to adjust the inclination of the optical axis of the second objective lens 13. Therefore, the adjusting pins 27a and 27b and the optical axis inclination measurement apparatus do not contact each other, and the adjustment of the optical axis of the objective lens can be performed more easily.

Further, the first grooves 14i and the second grooves 14j are formed as grooves leading to the inner side of the mounting hole 14e of the lens holder 14, and therefore the bonding adhesive can be easily applied to the outer periphery of the second objective lens 13 via the grooves 14i and 14j.

In addition, a plurality of the first grooves 14i and a plurality of the second grooves 14j are formed along the inner circumference of the mounting hole 14e of the lens holder 14, and therefore the second objective lens 13 can be fixed with a uniform adhesive force in the circumferential direction.

Furthermore, the inclination of the optical axis of the second objective lens 13 is adjusted with reference to the inclination of the optical axis of the first objective lens 12 having been fixed to the lens holder 14 without adjusting the inclination of the optical axis, and therefore the optical axes of two objective lenses can be parallel in a simple manner.

Embodiment 2

In the above described Embodiment 1, explanation has been given of the objective lens driving apparatus of a rotary-type in which the light flux emitted from the blue semiconductor laser and the light flux emitted from the dual-wavelength semiconductor layer pass through the common light path, and the objective lenses are switched according to the optical disk 11 to be used. In contrast, this Embodiment 2 relates to an objective lens driving apparatus of a wire-supported type in which a light flux emitted from a blue semiconductor laser and a light flux emitted from a dual-wavelength semiconductor laser proceed along different light paths and respectively pass through the first objective lens 12 and the second objective lens (i.e., the switching of the objective lenses by the rotation of the lens holder is not performed).

Figure 18:
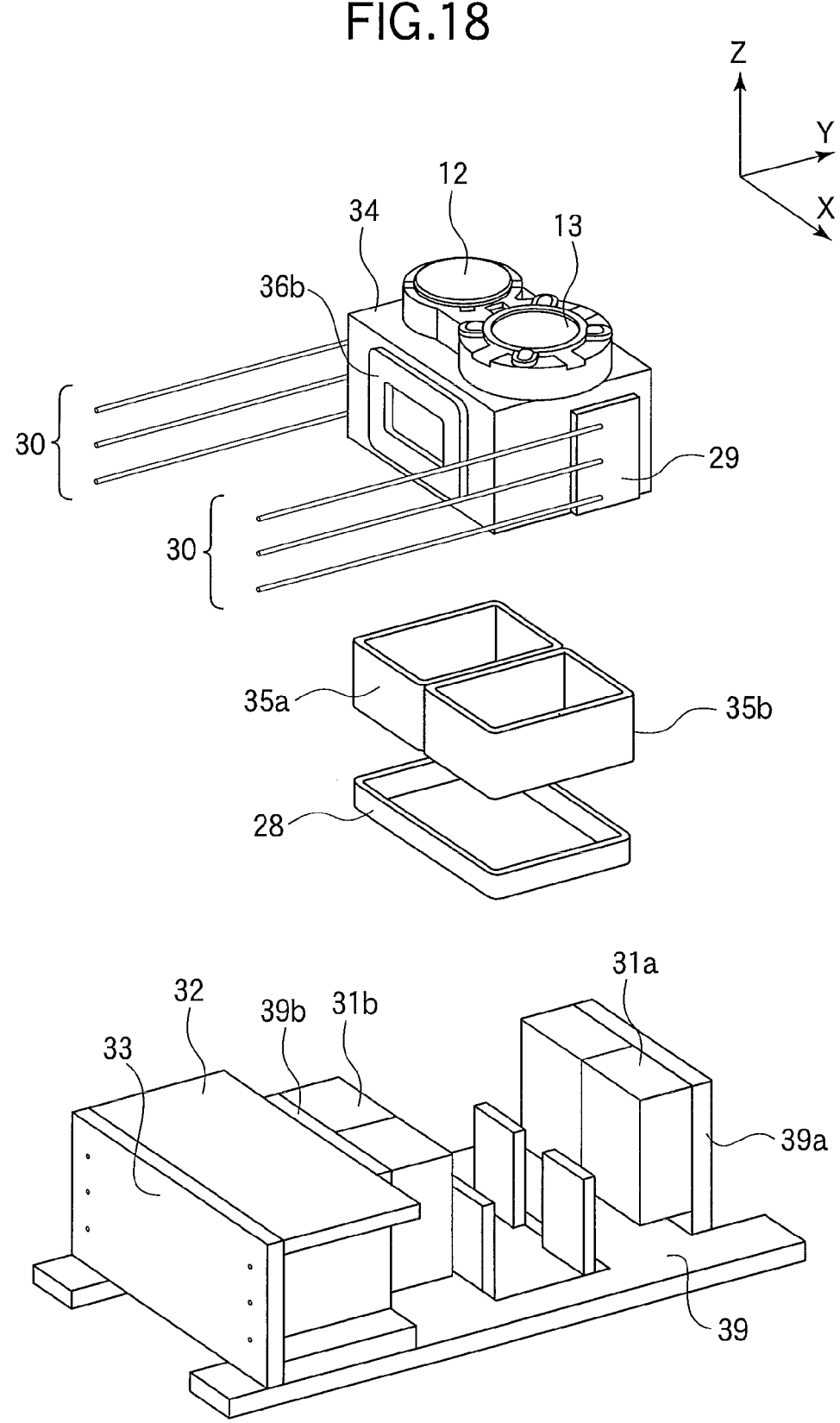
FIG. 18 is an exploded perspective view showing an objective lens driving apparatus according to Embodiment 2 of the present invention.
Figure 19:
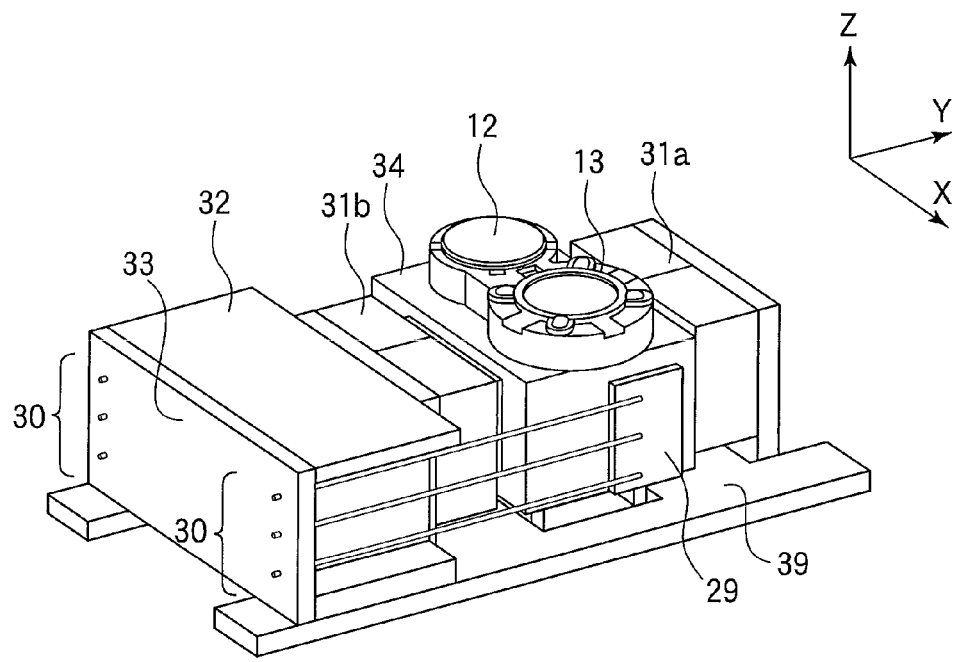
FIG. 19 is a perspective view showing the objective lens driving apparatus according to Embodiment 2 of the present invention.
Figure 20:
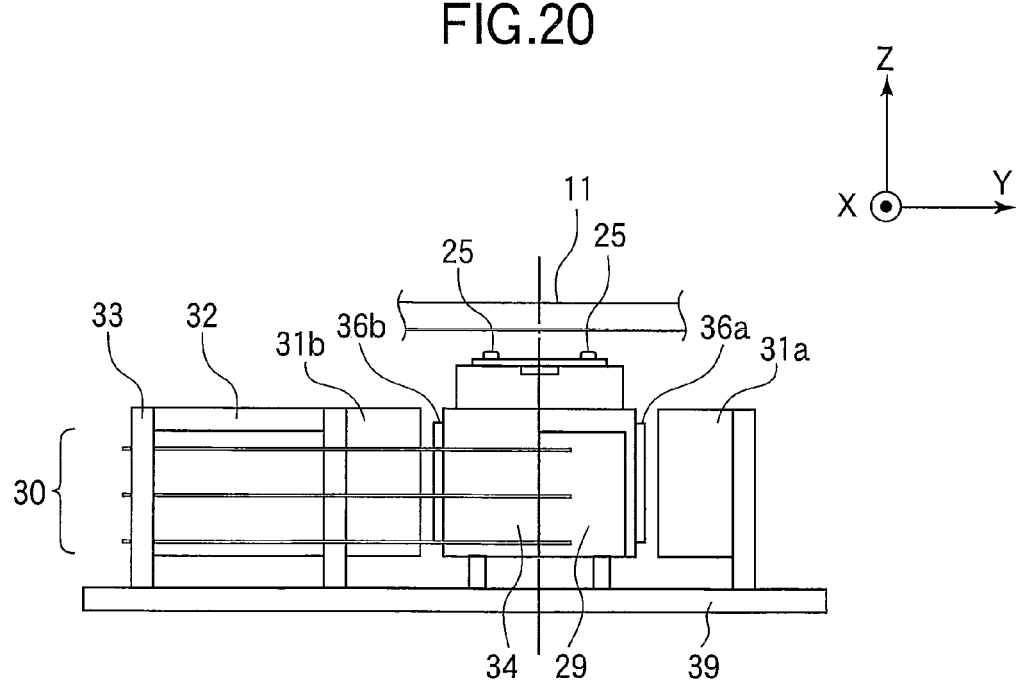
FIG. 20 is a side view showing the objective lens driving apparatus according to Embodiment 2 of the present invention.

FIG. 18 is an exploded perspective view showing an objective lens driving apparatus according to Embodiment 2 of the present invention. FIG. 19 is a perspective view showing the objective lens driving apparatus after being assembled. FIG. 20 is a side view showing the objective lens driving apparatus of FIG. 19. In FIGS. 18 through 20, components that are the same as the components described in Embodiment 1 are assigned the same reference numerals.

The objective lens driving apparatus includes a lens holder 34 that hold a plurality of (in this example, two) objective lenses 12 and 13. Two continuous rectangular focusing coils 35a and 35b are provided inside the lens holder 34. The focusing coils 35a and 35b are configured so that the light fluxes directed toward the objective lenses 12 and 13 respectively pass through inside the wound coils. As well as the focusing coils 35a and 35b, a tilt coil 28 is fixed inside the lens holder 34 by bonding. Tracking coils 36a and 36b (the tracking coil 36a is shown in FIG. 20) are fixed to both end surfaces of the lens holder 34 in the Y direction.

Relay boards 29 are respectively fixed to both side surfaces of the lens holder 34. Respective wire ends of the focusing coils 35a and 35b, the tracking coils 36a and 36b and the tilt coil 28 are fixed to the respective relay boards 29 by soldering. Further, wires 30 formed of beryllium copper having resiliency and electrical conductivity are fixed to both side surfaces of the lens holder 34 in parallel to each other so that three wires 30 are fixed to each side surface (six in total on both side sides). End portions of the respective wires 30 on the lens holder 34 side are fixed to the relay boards 29 using soldering.

A pair of walls 39a and 39b are formed on the base yoke 39 of the objective lens driving apparatus so as to face each other in the Y direction. Magnets 31a and 31b, each of which is magnetized into two poles, are fixed to the walls 39a and 39b. Further, a gel holder 32 is fixed to the base yoke 39, and a board 33 is fixed to the gel holder 33. One ends of the wires 30 penetrating the gel holder 32 are fixed to the board 33 by soldering. By resilient deformation of the wires 30 supported by the gel holder 32, the lens holder 34 is resiliently supported so as to be movable in a focusing direction (the Z direction), a tracking direction (the X direction) and a radial-tilt direction (a rotational direction about an axis of the Y direction).

An operation of the above configured objective lens driving apparatus will be described.

The controlling of focus error and tracking error is performed in a similar manner to Embodiment 1 by allowing control current to flow through the focusing coils 35a and 35b and the tracking coils 36a and 36b from the board 33 via the wires 30. After application of current to the respective coils is stopped, the lens holder 34 returns to the reference position by a resilient force of the wires 30.

In order to correct an inclination in a radial direction of the optical disk 11, radial-tilt control current is applied to the tilt coil 28 from the board 33 via the wires 30. An interaction between the radial-tilt control current and the magnetic field caused by the magnets 31a and 31b generates a moment that rotates the lens holder 34 about an axis of the Y direction. As a result, the objective lenses 12 and 13 rotate in the radial tilt direction (i.e., the rotational direction about the axis of the Y direction), and a radial tilt control of the light spot is performed. After application of current to the tilt coil 28 is stopped, the lens holder 34 returns to the reference position due to the resilient force of the wires 30 (in torsional direction). The other operations are the same as in Embodiment 1.

Next, a mounting structure and bonding method of the second objective lens 13 will be described with reference to FIGS. 21 through 24. In this regard, a mounting structure and bonding method of the first objective lens 12 are the same as those in Embodiment 1.

Figure 21:
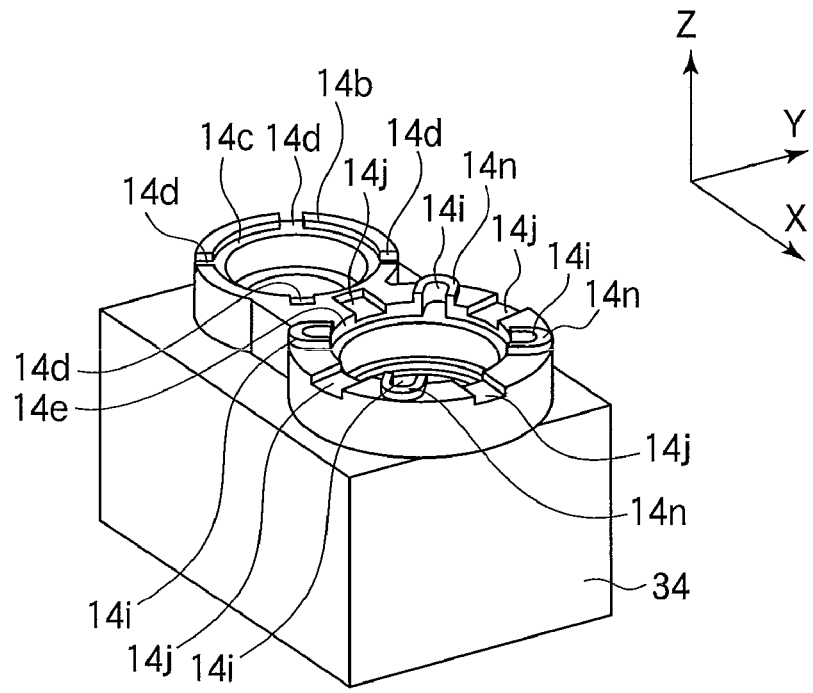
FIG. 21 is a perspective view showing a lens holder according to Embodiment 2 of the present invention.

FIG. 21 is a perspective view showing the lens holder 34 before the objective lenses 12 and 13 are mounted thereto. As shown in FIG. 21, the lens holder 34 has a mounting hole 14*e* for mounting the second objective lens 13. Four first grooves 14*i* for applying bonding adhesive are formed on a wall portion around the mounting hole 14*e* at constant intervals. Surrounding portions 14*n* of the first grooves 14*i* are formed to be higher than other part of a wall portion surrounding the mounting hole 14*e*. Second grooves 14*j* for applying bonding adhesive are formed between adjacent first grooves 14*i*. Different from Embodiment 1, four second grooves 14*j* in total are provided so that each second groove 14*j* is disposed between adjacent two first grooves 14*i*.

In Embodiment 2, the contact surfaces 14*f*, 14*g* and 14*h* (FIG. 6) and adjusting holes 14*k* and 14*m* as in Embodiment 1 are not provided.

Figure 22:
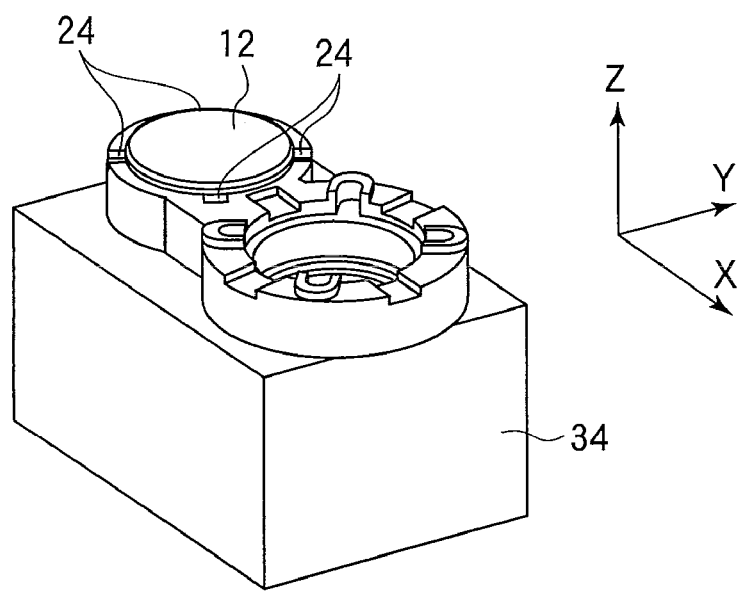
FIG. 22 is a perspective view showing the lens holder according to Embodiment 2 of the present invention in a state where a first objective lens is mounted thereto.
Figure 23:
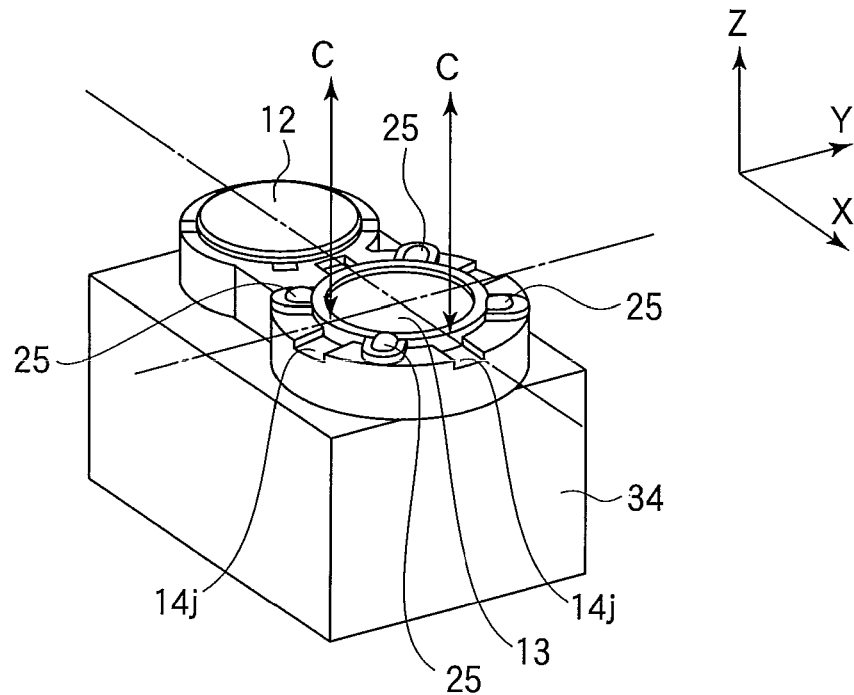
FIG. 23 is a perspective view showing the lens holder according to Embodiment 2 of the present invention in a state where a second objective lens is mounted thereto using a first bonding adhesive.

FIG. 22 is a perspective view showing the lens holder 34 to which the first objective lens 12 is mounted. FIG. 23 is a view showing a state where the second objective lens 13 is set to the lens holder 34 and the first bonding adhesive 25 is applied thereto. First, the lens holder 34 is mounted to a fixture (not shown), and the first objective lens 12 is inserted into the mounting hole 14*b* and is fixed using the bonding adhesive 24 (FIG. 22) as was described in Embodiment 1. Next, the second objective lens 13 is inserted into the mounting hole 14*e* of the lens holder 34, and the first bonding adhesive 25 is applied to the four first grooves 14*i* (FIG. 21), so as to fix the second objective lens 13 (FIG. 23). In this state, the first bonding adhesive 25 is applied in such a manner that an upper surface thereof protrudes with respect to the first objective lens 12 and the second objective lens 13 toward the optical disk 11 side.

Here, the first bonding adhesive 25 is a room temperature curable silicone rubber based resin (RTV rubber) or ultraviolet curable silicone rubber based resin, and has a rubber-like resiliency after curing. Therefore, in a state where the second objective lens 13 is detached from the fixture, the second objective lens 13 is resiliently held by the first bonding adhesive 25 with respect to the lens holder 34. Therefore, an inclination of the optical axis of the second objective lens 13 can be adjusted by pushing an edge portion of the second objective lens 13 in the Z direction as shown by arrows C in FIG. 23.

Figure 24:
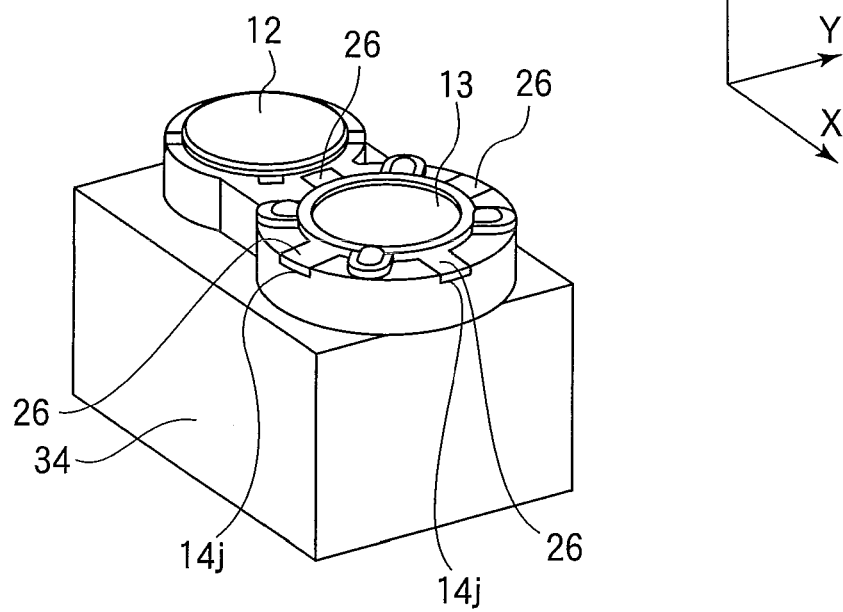
FIG. 24 is a perspective view showing a state where the inclination of the optical axis of the second objective lens is adjusted, and the second objective lens is fixed using a second bonding adhesive according to Embodiment 2 of the present invention.

As was described in Embodiment 1, an inclination of the lens holder 34 (i.e., an inclination of the adjustable table 101) is adjusted using the gonio stage 100 and the optical axis inclination measurement apparatus 103 (FIG. 14) so that the inclination of the optical axis of the first objective lens 12 becomes 0. Next, the light spot formed by the second objective lens 13 is measured using the optical axis inclination measurement apparatus 103, and the edge portion of the second objective lens 13 is pushed as shown by arrows C in FIG. 23 so that the inclination of the optical axis of the second objective lens 13 becomes 0. In this state, the second bonding adhesive 26 of ultraviolet curable type is applied to the second grooves 14*j* as shown in FIG. 24, and is irradiated with ultraviolet rays, so that the second objective lens 13 is fixed to the lens holder 34. With such process, the first and second objective lenses 12 and 13 are fixed to the lens holder 34 so that optical axes thereof are parallel to each other. Other functions are the same as those of Embodiment 1.

As described above, in this embodiment, the adjustment of the optical axis of the objective lens can be performed with a high degree of accuracy using a simple jig, without using a large-scale adjusting apparatus (for example, a manipulator or the like) that positions the objective lens with respect to the lens holder with a high degree of accuracy, as in Embodiment 1.

In the above described Embodiments 1 and 2, explanation has been given of adjustment of the optical axis of the second objective lens 13 with reference to the optical axis of the first objective lens 12 in the objective lens driving apparatuses of rotary-type and wire-supported type to which two objective lenses are mounted. However, a reference for adjusting the optical axis of the objective lens can be other element such as the shaft-receiving hole 14*a* of the lens holder 14. Furthermore, the number of objective lens(es) mounted on the lens holder 14 (34) can be one, and can be three of more.

Furthermore, in the above described Embodiments 1 and 2, the known optical axis inclination measuring apparatus (an optical pickup spot evaluation apparatus) configured to measure the inclination of the optical axis of the objective lens based on the aberration of the light spot of the light flux having passed the objective lens is used. However, it is needless to say that it is also possible to use a laser auto collimator or the like capable of measuring an inclination of a reference surface or an edge portion of the objective lens.

The present invention is applicable to, for example, optical disk devices such as BD players, BD recorders, HD-DVD players or HD-DVD recorders.

The invention claimed is:

1. An objective lens driving apparatus comprising:
    a first objective lens and a second objective lens for collecting a light flux emitted from a light source on an information recording medium, and
    a lens holder holding the first and second objective lenses,
    wherein the lens holder comprises a first bonding portion and a second bonding portion for holding the second objective lens by means of bonding, and a hole portion through which an adjusting member for adjusting an inclination of an optical axis of the second objective lens can be inserted from a side opposite to the information recording medium side, and
    wherein the second objective lens is fixed to the lens holder by applying a first bonding adhesive to the first bonding portion to thereby bond the second objective lens thereto, adjusting the inclination of the optical axis of the second objective lens with reference to an optical axis of the first objective lens using the adjusting member while causing the first bonding adhesive to deform, and applying a second bonding adhesive to the second bonding portion, the second bonding adhesive having a larger Young's modulus after curing than the first bonding adhesive.

2. The objective lens driving apparatus according to claim 1, wherein the first bonding adhesive protrudes toward the information recording medium with respect to surfaces of the first and second objective lenses on the information recording medium side.

3. The objective lens driving apparatus according to claim 1, wherein the first bonding adhesive contains silicone rubber.

4. The objective lens driving apparatus according to claim 1, wherein the first and second bonding portions are grooves leading to an inner side of a mounting hole formed on the lens holder for mounting the second objective lens.

5. The objective lens driving apparatus according to claim 1, wherein the lens holder has a contact surface on which the second objective lens can be placed so that the second objective lens is inclined with respect to a direction perpendicular to a recording surface of the information recording medium.

6. The objective lens driving apparatus according to claim 1, wherein a plurality of first bonding portions and a plurality of second bonding portions are formed along a periphery of a mounting hole formed on the lens holder for mounting the second objective lens.

7. An objective lens driving apparatus comprising:
a first objective lens and a second objective lens for collecting a light flux emitted from a light source on an information recording medium, and
a lens holder holding the first and second objective lenses, wherein the lens holder comprises:
a first mounting hole to which the first objective lens is mounted;
a second mounting hole to which the second objective lens is mounted;
a first bonding portion and a second bonding portion formed along a periphery of the second mounting hole;
a hole portion through which an adjusting member for adjusting an inclination of an optical axis of the second objective lens with reference to an optical axis of the first objective lens can be inserted from a side opposite to the information recording medium side,
a first bonding adhesive applied to the first bonding portion before the optical axis of the second objective lens is adjusted using the adjusting member, and
a second bonding adhesive applied to the second bonding portion after the optical axis of the second objective lens is adjusted using the adjusting member, the second bonding adhesive having a larger Young's modulus after curing than the first bonding adhesive.

8. The objective lens driving apparatus according to claim 7, wherein the first bonding adhesive protrudes toward the information recording medium with respect to surfaces of the first and second objective lenses on the information recording medium side.

9. The objective lens driving apparatus according to claim 7, wherein the first bonding adhesive contains silicone rubber.

10. The objective lens driving apparatus according to claim 7, wherein the first and second bonding portions are grooves leading to an inner side of the second mounting hole formed on the lens holder.

11. The objective lens driving apparatus according to claim 7, wherein the lens holder has a contact surface in the mounting hole on which the second objective lens can be placed so that the second objective lens is inclined with respect to a direction perpendicular to a recording surface of the information recording medium.

12. The objective lens driving apparatus according to claim 7, wherein a plurality of first bonding portions and a plurality of second bonding portions are formed along a periphery of the second mounting hole formed on the lens holder.

13. A manufacturing method of an objective lens driving apparatus having a first objective lens and a second objective lens for recording information on or reproducing information from an information recording medium, the manufacturing method comprising the steps of:
fixing the first objective lens to a lens holder;
bonding the second objective lens to the lens holder by applying a first bonding adhesive to a first bonding portion provided on the lens holder;
adjusting an inclination of an optical axis of the second objective lens with reference to an optical axis of the first objective lens using an adjusting member inserted through a hole portion formed on the lens holder from a side opposite to the information recording medium side, and
fixing the second objective lens to the lens holder by applying a second bonding adhesive to a second bonding portion provided on the lens holder, the second bonding adhesive having a larger Young's modulus after curing than the first bonding adhesive.

* * * * *